United States Patent [19]

Tisue

[11] Patent Number: 4,620,232
[45] Date of Patent: Oct. 28, 1986

[54] RESET CIRCUIT FOR MOS IMAGER ARRAY

[75] Inventor: J. Gilbert Tisue, Los Altos, Calif.

[73] Assignee: Fuji Photo Film Co., Ltd., Kanagawa, Japan

[21] Appl. No.: 711,941

[22] Filed: Mar. 15, 1985

[51] Int. Cl.$^4$ .............................................. H04N 3/14
[52] U.S. Cl. ..................................................... 358/213
[58] Field of Search ....................... 358/212, 213, 209

[56] References Cited

U.S. PATENT DOCUMENTS

| | | | |
|---|---|---|---|
| 4,335,405 | 6/1982 | Sakane et al. | 358/213 |
| 4,496,980 | 1/1985 | Pfleiderer et al. | 358/213 |
| 4,531,156 | 7/1985 | Nishizawa et al. | 358/212 |
| 4,547,806 | 10/1985 | Herbst et al. | 358/213 |

Primary Examiner—Gene Z. Rubinson
Assistant Examiner—Stephen Brinich
Attorney, Agent, or Firm—Sughrue, Mion, Zinn, Macpeak, and Seas

[57] ABSTRACT

A reset circuit for a MOS imager array in which a reset gate that normally has its source grounded and its gate controlled by a column signal, in order to pass a row signal to a row of imaging elements, has a high chip reset signal applied to its drain. A high chip reset signal is then passed to the row irrespective of the row signal. As a result, the imaging elements are reset on all the rows simultaneously without the need of cycling the row signal.

9 Claims, 8 Drawing Figures

RESET CIRCUIT FOR MOS IMAGER ARRAY

DESCRIPTION

1. Field of the Invention

This invention relates generally to semiconductor imaging arrays, and, in particular, to a circuit for quickly resetting all pixels in an array.

2. Background of the Invention

One of the recent developments in electrotechnology is the availability of large, twodimensional imaging arrays. Such an array is composed of a large number of photosensors onto which an image is projected. Each individual photosensor integrates the light intensity falling upon it and at the end of a fixed period, the integrated intensity is read by reading circuitry. The reading circuitry reads the values from each sensor and so obtains an electronic equivalent of the entire image.

One of the commonest electronic imagers is a MOS imager which uses a depleted capacitive junction as an individual photocell. The equivalent circuit for a MOS photocell is shown in FIG. 1. The photocell 10 has a MOS capacitor 12 which can be charged only with one polarity, here shown as positive. A diode 14 is included to show the impossibility of reverse charging. Each photocell 10 is controlled by a photocell gate 16, controlled by a gate electrode 18, which gates the signal on the capacitor 12 to a read electrode 20.

In an initialization or reset phase, external circuitry sets the read electrode 20 to a reference voltage and the gate 16 causes the reference voltage to be impressed on the capacitor 12. The gate electrode 18 then opens the gate 16 to isolate the capacitor 12 from the read electrode 20.

In a subsequent imaging phase, photons of the incident light impinge on the photocell 10 and cause the MOS capacitor 12 to partially discharge. Broadly stated, each impinging photon discharges a fixed amount of charge from the charged capacitor 12 with a corresponding reduction in the voltage across the capacitor 12. The amount of discharge is thus proportional to the intensity of the imaged light, assuming of course that the capacitor has not been completely discharged.

Following the imaging phase, which is usually a fixed period so that the same relationship between discharge and light intensity obtains for all photocells, the photocell is read in a reading phase. The gate electrode 18 turns on the gate 16 so that the reading circuitry can measure the amount of discharge. Usually the reading circuitry is designed to measure the decrement of charge caused by incident light and to simultaneously reinitialize or reset the photocell 10 for the next imaging period.

An example of a conventional MOS imager is illustrated in FIG. 2 along with much of its reading circuitry. A pixel array 22 consists of rows and columns of photocells 10, each of the form shown in FIG. 1. The rows are defined by word lines 24, and the columns by bit lines 26. The terminology is borrowed from digital MOS memory technology. A word line 24 is connected to the gate electrodes 18 of every photocell in the row associated with that word line. A bit line 26 is connected to the read electrode 20 of every photocell in the column associated with that bit line.

A vertical shift register 28 controls the selection of the rows by sequentially enabling vertical shift register lines 30. The vertical shift register lines 30 control an interlace gate circuit 32 that enables at any time one of the word lines 24. The purpose and operation of the interlace gate circuit will be described later. A horizontal shift register 34 controls the columns by sequentially enabling one of the horizontal shift register lines 36, each controlling the gate of a bit line gate 38. One side of each gate 38 is connected to one of the bit lines 26 and the other side of all gates is connected to the inverting input of an operational amplifier 40. The non-inverting input of the operational amplifier 40 is held at the reference voltage $V_{REF}$ and a feedback resistor 41 determines the current-to-voltage gain of the amplifier 40 which outputs the amplified signal output 42.

The horizontal shift register 34 is operated much faster than the vertical shift register 28 so that all the columns are sequentially read while a single row is enabled. An enabled word line 24 enables all photocells 10 attached to that line. The signal on the capacitor 12 is then transferred to the bit line 26 attached to that photocell 10. The horizontal shift register 34 sequentially connects the bit lines 26 to the amplifier 40 to transfer the photocell signal to the signal output 42. The two inputs to the operational amplifier 40 will eventually be brought into equality by the amplifier 40 so that a reading of a photocell 10 will also cause its capacitor 12 to be reset to the reference voltage $V_{REF}$. The result is a series of analog pulses on the signal output 42 with the area of each pulse corresponding to the amount of discharge of the separate capacitors 12 induced by the imaged light. Some read-out schemes do not simultaneously turn on the two gates 16 and 38. Instead, nearly the same operation is accomplished by first turning on with one word line 24 the photocell gates 16 attached to that word line 24 so as to substantially transfer the charge on the capacitors 12 to the capacitance of the attached bit lines 26. After the photocell gate 16 is turned off, subsequent, sequential closures of the bit line gates 38 will transfer charge onto the amplifier 40, as described earlier.

After one row is read, another row is enabled by the vertical shift register 28 for similar reading so that the entire pixel array 22 is outputted to the signal output 42 on a cycle of the vertical shift register 28.

MOS imaging arrays of the type shown in FIG. 2 have been used for video cameras producing periodic frames of images, such as a television camera. Care must be exercised in timing the shift registers with respect to the frame rate, but once the camera has begun operating, synchronization between the start of the frame and the initialization of the shift registers is not a problem because of the continuous recording process. Recently, however, MOS imaging arrays have been applied to single frame or single shot cameras as a replacement for the silver halide recording medium of 35 mm cameras, for instance. Single frame MOS imaging presents several problems not present for multiple frame recording. First, the previous read cycle cannot be relied upon for resetting the photocells since the single shots may be widely separated in time and an unavoidable dark current will cause the photocells to discharge spontaneously over times on the order of a second or less. In multiple frame cameras, the first few frames could be sacrificed to a worthless dark current image with the remaining frames being reset by the read operation of the preceeding frame. Secondly, the single shot is randomly timed and the shutter must be coordinated with the shift registers. In multiple frame cameras, the exact phase of the frames is relatively unimportant as long as the interframe timing is maintained so that synchronization is much less of a problem.

One approach for timing single frame cameras is illustrated in FIG. 3. A frame starts with a start signal which causes the vertical shift register 28 to be initialized and is followed by a reset read cycle. The reset read cycle is equivalent to an actual read cycle except that the output signal is not recorded. After the reset read cycle, the shutter opens for a length of time determined by the exposure conditions. Following the exposure, the MOS imaging chip is read in an actual read cycle and the signal output is electronically recorded. As a practical matter, it is unlikely that specific sensor characteristics would allow accurate resetting of the photocells 10 in only one read cycle. However, the one cycle represents the minimum necessary for such resetting in the described approach.

This timing procedure can be implemented electrically by the circuit illustrated in FIG. 4 which shows a simplified interlace gate circuit 44. This circuit shows two vertical shift register lines 30 and two word lines 24 although many more similarly configured lines are included in a typical interlace gate circuit. Each vertical shift register line 30 gates a voltage onto one word line 24 through a line gate 46. However all word lines 24 can be grounded by a high RESET signal applied to reset gates 48 between the word lines 24 and ground. Technically, the circuit of FIG. 4 is not an "interlace" circuit because an interlace circuit would not have the one-to-one correspondence between the shift register lines 30 and the word lines 24. A more proper description for FIG. 4 would be a non-interlaced interface between the vertical shift register 30 and the word lines 24. However the terminology of "interface circuit" will be used in view of its placement and its relation to a true interlace circuit to be described later.

In a typical application, the RESET signal is held high except during the time when the vertical shift register 28 enables the reading and resetting of the photocells 10. The RESET is pulsed low in synchronism with the vertical register 28 to return the voltage on word lines 24 to ground after the charges on the row of photocells 10 have been transferred to the corresponding bit lines 26.

This procedure, however, requires that the reset read be at least as long as the actual read cycle. This long reset period causes a fairly long average dark current accumulation period, thus degrading the quality of the electronically recorded image. Furthermore, the long reset period delays the actual exposure period, following the reset read, from the triggering of the operation making it more difficult to synchronize with a shutter.

SUMMARY OF THE INVENTION

Accordingly, an object of this invention is to provide a reset circuit for a MOS imager array.

Another object of this invention is to provide a reset circuit that quickly resets the entire MOS imager array.

The invention can be summarized as a reset circuit in which a chip reset signal can be simultaneously applied to all word lines in a MOS imager array to reset simultaneously the photocells on all the word lines. The chip reset can be combined with the conventional line reset circuitry. In normal operation the chip reset applied to the sources of the reset gates is grounded and line gates gate the vertical shift register outputs onto the word line. In the chip reset mode, the chip reset is held high and the reset gates gate the high chip reset signal onto all the word lines.

DETAILED DESCRIPTION OF THE PREFERRED EMBODIMENTS

Figure 5:
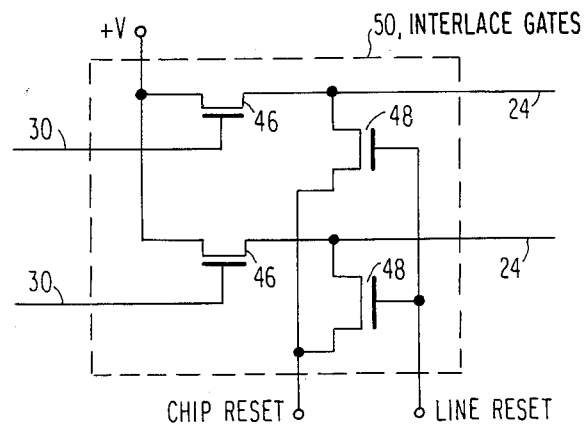
FIG. 5 is a schematic illustration of one embodiment of the invention, applied to the interface circuit of FIG. 4.

According to the invention, all the word lines in a MOS imager array can be simultaneously reset. In one simple embodiment of the invention, illustrated by the schematic of FIG. 5, an interlace gate circuit 50 operates similarly to the interlace gate circuit 44 of FIG. 4. Once again, the circuit 50 is called an interlace circuit although it lacks an interlacing function. The sequentially enabled signal from the vertical shift register arrive on the vertical shift register lines 30 to sequentially enable the line gates 46 to the word lines 24. Each of a plurality of reset gates 48 has its drain attached to the associated word line 24. The gate of every reset gate 48 is controlled by a LINE RESET signal while the source of every reset gate 48 is attached to a CHIP RESET signal. The LINE RESET corresponds to the RESET of FIG. 4 and is typically clocked synchronously with the vertical shift register 28. In normal operation, the CHIP RESET signal is low or grounded and the interlace gate circuit 50 then operates exactly like the interlace gate circuit 44 of FIG. 4. That is, when LINE RESET is low the vertical shift register sequentially gates the voltage +V onto the word lines 24. When LINE RESET is high, all the drains of the reset gates 48 are grounded to the low value of CHIP RESET to return any word line 24 to a low state if it has been in a high state.

Figure 2:
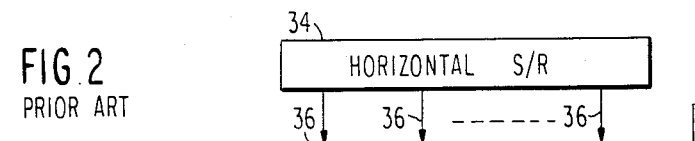
FIG. 2 is a schematic illustration of a MOS imager array and its support circuitry.
Figure 3:
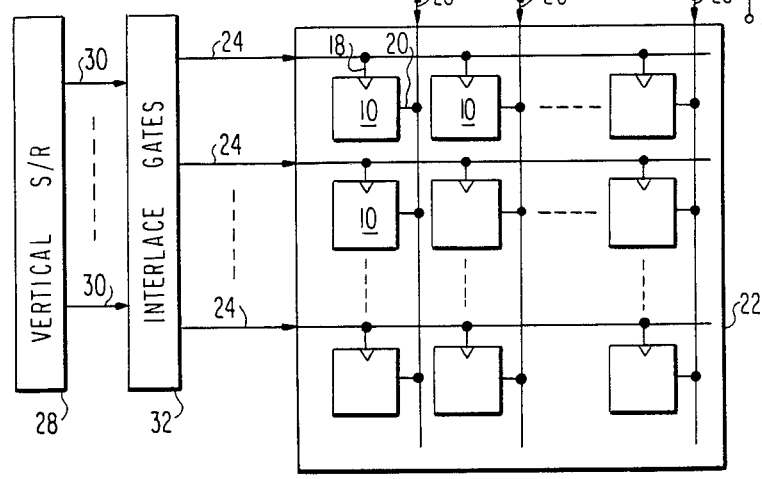
FIG. 3 is a timing diagram, different than that of the present invention, for a single frame MOS camera.
Figure 3:
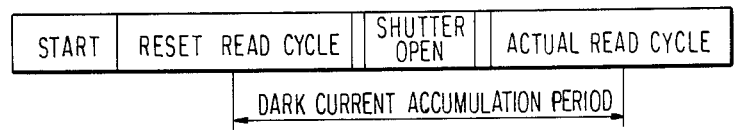

When CHIP RESET and LINE RESET are both high, all the word lines 24 are simultaneously high to thus enable all the photocells 10 in the entire pixel array 22 to be reset in sequence by the outputs of the horizontal shift register 34. The word lines 24 are high in this case regardless of the value of the signals on the vertical shift register lines 30. Thus a word line 24 can go high either because it has been enabled by a high vertical shift register line 30 and a low LINE RESET signal or by a high CHIP RESET signal and a high LINE RESET signal. In order that all the photocells 10 are to be reset, the CHIP RESET signal and the LINE RESET signal must be held high for an entire cycle of the horizontal shift register 34. However, this time is much less than that required in the conventional resetting process in which a complete resetting is accomplished over a complete cycle of the vertical shift register 28. It should be borne in mind that the horizontal shift register 34 completely recycles in a single clock period of the vertical shift register 28. Note also that the CHIP RESET line can be pulsed at the beginning of a horizontal scan in a manner similar to that of the alternative read-out scheme described for FIG. 2 such that the photocell gates 16 are not turned on simultaneously with the bit line gates 38.

Figure 6:
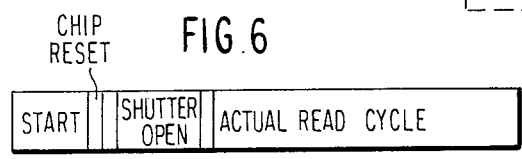
FIG. 6 is a timing diagram for a single frame MOS camera according to the present invention.

The interlace circuit of FIG. 5 allows the MOS imager array to be reset according to the timing diagram of FIG. 6. Following the start, the high CHIP RESET enables the resetting of the MOS imager in one complete cycle of the horizontal shift register 34. Thereafter, the imager is ready for exposure and the shutter can be opened. The MOS imager is then read in the normal way with the CHIP RESET signal held low. This arrangement provides for a significant decrease in the average dark current because of the decrease in the average accumulation period. Furthermore, the shutter can be opened and the exposure begun much more quickly following the start of the sequence. The additional circuitry required to provide these advantages is minimal over the circuitry described in the background.

The interlace gate circuit that has been described requires modificaton for use with conventional electronic color cameras so as to provide true interlacing functions. In conventional color cameras, the four colors of green, yellow, cyan and white are grouped into a quad of cells on two neighboring rows. The rows are read two at a time by the use of at least two amplifiers, corresponding to the amplifier 40 in FIG. 2, to allow the proper interlacing of the colors of the quad. However the rows are paired differently on subsequent cycles of the vertical shift register 28, called the A cycle and the B cycle. Sometimes the terminology of field 1 and field 2 is used for the two cycles. For example, on the A cycle the rows are read in the following sequence: (0,1), (2,3), (4,5), etc. But in the B cycle the sequence is: (1,2), (3,4), (5,6), etc. As will be appreciated by anyone of ordinary skill in the art, the different pairing of rows during adjacent cycles results in interlaced scanning, a technique generally used in electron beam cameras and cathode ray tubes as well as in semiconductor image arrays. It should be noted that describing the use of this concept to an interlaced chip is primarily for completeness since most chips are color interlaced or at least interlaced for some reason. However, a single frame reset and readout scheme would not normally be concerned with both the A and B cycles since an A cycle would read out all photocells and another synchronizing exposure would be necessary to have something to read for either an A or a B cycle. However, this description demonstrates that standard, commercially available interlaced circuits can be easily adapted to the present invention.

Figure 7:
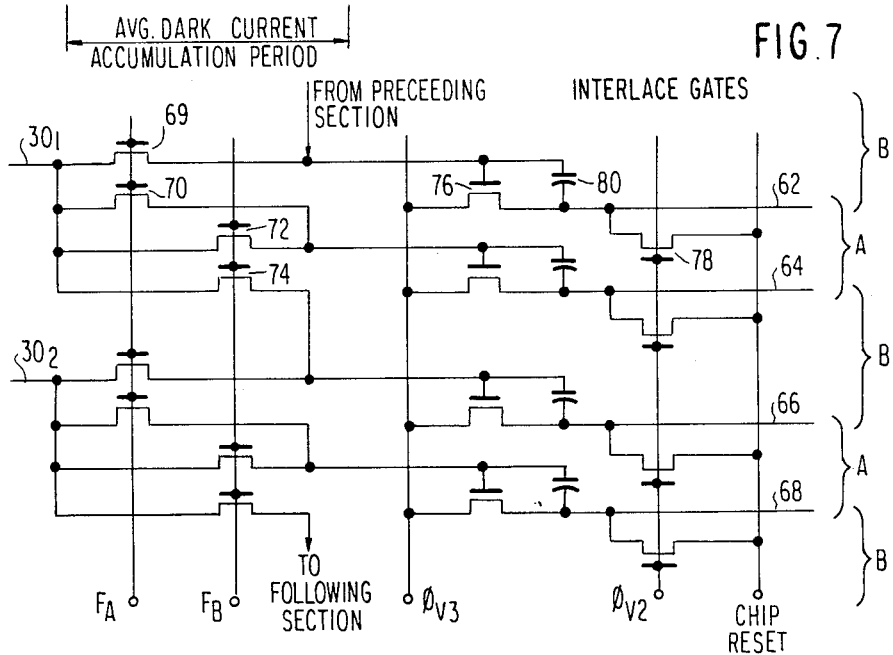
FIG. 7 is a schematic illustration of another embodiment of the invention.

In FIG. 7 are illustrated two sections of an interlace gate with the above characteristic. Two vertical shift register lines $30_1$ and $30_2$, collectively referred to as line 30 when there is no need to differentiate them, of the two illustrated sections are shown controlling four word lines 62, 64, 66 and 68.

In an A cycle of the vertical shift cycle, an $F_A$ signal is high to enable two gates 69 and 70 associated with the word lines 62 and 64. In the subsequent cycle of the vertical shift register, a signal $F_B$ goes high to enable two gates 72 and 74 associated with the word lines 64 and 66. During this subsequent B cycle, the signal $F_A$ is low. The signal $F_B$ is low during the A cycle. The result is that an A pair of word lines 62 and 64 are enabled on the A cycle and a B pair 64 and 66 are enabled on the B cycle.

The single reset gate 48 of FIG. 5 is replaced with a bootstrap gate 76 and a reset gate 78. The signal on the vertical shift register line 30, enabled by the gates 69-74, controls the gate electrode of the bootstrap gate 76 and a capacitor 80 connected to the source of the bootstrap gate 76. The source of the bootstrap gate 76 is connected to the drain of the reset gate 78. In conventional operation, the source of the reset gate 78 is grounded. The gates 76 and 78 are controlled by timing signals $\phi_{V2}$ and $\phi_{V3}$ connected respectively to the gate electrode of the reset gate 78 and the draian of the bootstrap gate 76.

Figure 8:
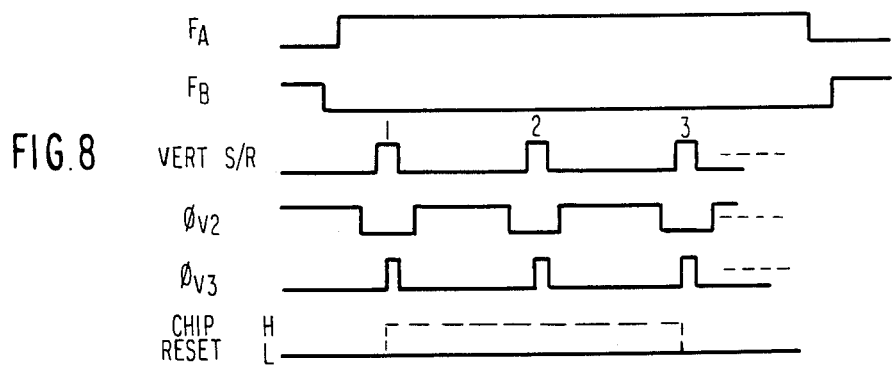
FIG. 8 is a preferred timing diagram for the embodiment of FIG. 7.
Figure 1:
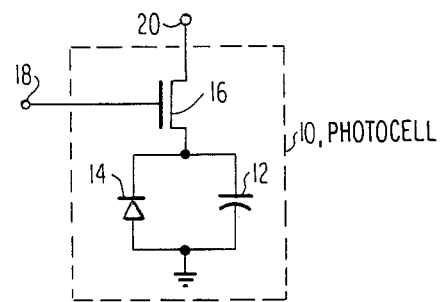
FIG. 1 is a schematic illustration of a conventional MOS photocell.

The typical operation of the interlace circuit of FIG. 7 is described with reference to the timing diagram of FIG. 8. The vertical shift register 28 produces a series of pulses on the vertical shift register lines 30, one pulse on each line 30 for each complete cycle of the horizontal shift register 34. In the A cycle, the signal $F_A$ is high and the signal $F_B$ is low, as illustrated. In the unillustrated B cycle, the polarities of the $F_A$ and $F_B$ signals are reversed. The pulses of the timing signals $\phi_{V2}$ and $\phi_{V3}$ are synchronized with the pulses from the vertical shift register 28 and the negative $\phi_{V2}$ pulse begins somewhat sooner than the positive $\phi_{V3}$ pulse.

In normal operation, CHIP RESET is grounded and the high interpulse period of the $\phi_{V2}$ signal causes the reset gate 78 to connect this ground to the word lines 62-68 during the interpulse period. With CHIP RESET grounded, the circuit is identical to a normal interlace circuit. However, during the low pulse of $\phi_{V2}$, the word lines 62-68 are isolated by the reset gate 78 from the grounded CHIP RESET. Then the high-pulse on the selected vertical shift register line $30_1$ charges the gate of the bootstrap gate 76 so that it is ready to pass the high $\phi_{V3}$ pulse to the word lines 62. When the $\phi_{V3}$ signal rises, the bootstrap gate 76 is held on by the bootstrap operation of the bootstrap gate 76 and the capacitor 80. The gate 69 is turned off since its gate and drain (connected to line $30_1$) are at the same level, as is the gate in the preceding section. During the time of the $\phi_{V3}$ pulse, all the photocells 10 on the word line 62 are enabled. Simultaneously, the same operation occurs to allow the vertical shift register line $30_1$ to raise the word line 64. After the $\phi_{V3}$ pulse, the horizontal shift register 34 makes a complete cycle and thus reads and resets all the enabled photocells 10 on word lines 62 and 64.

During the A cycle, a high pulse on the shift register line $30_1$ enables the photocells on the word lines 62 and 64 and a high pulse on the shift register line $30_2$ enables the photocells on the word lines 66 and 68. On the other hand, during the B cycle, a high pulse on the shift register line $30_1$ enables word lines 64 and 66 and a high pulse on the shift register line $30_2$ enables the word line 68 and a word line on an unillustrated following section of the interlace circuit. Thus it is seen that a single cycle of the vertical shift register 28 will cause all photocells to be read. The $F_A$ and $F_B$ signals will cause different pairings of the word lines 62-68 on alternating A and B cycles of the vertical shift register 28.

For the resetting of all the photocells, the CHIP RESET and $\phi_{V2}$ signals are held high for a period equal to or greater than one horizontal cycle of the shift register 34. Then the high interpulse period of the $\phi_{V2}$ signal will open the reset gates 78 between the high CHIP RESET and all the word lines 62-68. To obtain the desired effect of resetting all the photocells, $\phi_{V2}$ and CHIP RESET must be high during at least one cycle of the horizontal shift register 34. The horizontal shift register 34 will cycle once during the length of a $\phi_{V2}$ high pulse so that all photocells are reset in the time of a $\phi_{V2}$ high pulse. Whatever signals are read from the photocells 10 during the global reset are sums of signals from multiple rows and are immaterial to the use of the imaging array. Also, whatever signals appear on the vertical shift register lines 30 or on the $F_A$ and $F_B$ lines do not affect the high signal transferred from the CHIP RESET to the word lines 62-68. Bootstrap operation of the reset gates 78 could be implemented similarly to the bootstrap operation of the gates 76.

Figure 4:
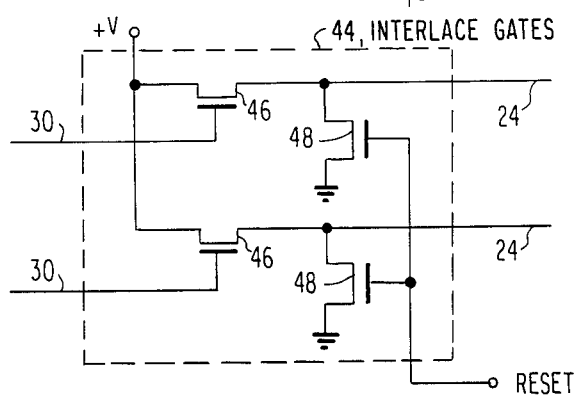
FIG. 4 is a schematic illustration of an interface circuit, related to an interlace gate circuit, for implementing the timing of FIG. 3.

Similarly to the description for FIGS. 4 and 5, the CHIP RESET of FIG. 7 can be used two ways. In one way, the word lines 62-68 are held high during the full read of the horizontal shift register 34. In the other way, the word lines 62-68 are pulsed high for a short time before each full read of the horizontal shift register 34.

Thus it is seen that the entire imaging array can be reset in one or, at the most, a few clock periods of the vertical shift register rather than the time required for a complete cycle of the vertical shift register. As a result, the average dark current is reduced to provide for clearer images. Furthermore, the time between the initiation of resetting and the opening of the shutter is reduced to produce more responsive electronic photography and to allow simpler mechanical design of the shutter itself.

Having thus described my invention, what I claim as new, and desire to secure by Letters Patent is:

1. An image-sensing device, comprising:
   a photosensing array comprising a plurality of photosensing elements arranged in intersecting rows and columns, photosensing elements arranged along a row being simultaneously activated for reading, a signal from any photosensing element activated along a column being read as a signal for that column; and
   means for sequentially resetting said columns of photosensing elements wherein all photosensing elements within each column are reset in a simultaneous operation.

2. The image sensing device of claim 1, wherein said array further comprises a first set of conductors defining said rows and a second set of conductors defining said columns, conductors of each said set being parallel within each set and perpendicular between sets, each of said photosensing elements being controlled by one conductor of said first set and having its signal transferred on one conductor of said second set, and wherein said resetting means comprises means for simultaneously applying a predetermined first potential to all conductors of said first set of conductors.

3. The image sensing device of claim 2, wherein said resetting means further comprises means for sequentially applying a predetermined second potential to said conductors of said second set.

4. The image sensing device of claim 3, wherein said means for simultaneously applying said predetermined first potential to all conductors of said first set of conductors comprises interlace gating means comprising a plurality of field-effect transistors, one transistor for each conductor of said first set, said transistor having a channel coupled between a chip reset signal terminal and a respective conductor of said first set and having a gate coupled to a line reset signal terminal.

5. The image sensing device of claim 4, wherein said line reset signal terminal is a terminal of a periodic signal having a period longer than the time required to sequentially apply said second potential to all said conductors of said second sets.

6. The image sensing device of claim 5, wherein each photo-sensing element comprises a photosensitive MOS element and a field-effect transistor connected between said MOS element and one conductor of said second set and the gate of which is connected to one conductor of said first set, wherein the application of said first potential to a first conductor of said first set causes the field-effect transistors in all photosensing elements controlled by said first conductor to conduct and wherein the concurrent application of said second potential to a second conductor of said second set charges the MOS element controlled by said first conductor and connected to said second conductor.

7. An image sensing device comprising:
   an array comprising first and second sets of conductors, conductors of each set being parallel to one another and conductors of said first and second sets being perpendicular to one another and further a plurality of photosensitive elements, a separate photosensitive element being operatively coupled to a conductor of said first set and to a conductor of said second set at any intersection of said conductors of said first and second set;
   a vertical shift register;
   interlace buffer means for interlacingly scanning said conductors of said first set in response to outputs of said vertical shift register, said interlace buffer means comprising a plurality of field-effect transistors, each having a channel coupled between a respective one of said conductors of said first set and a reset signal terminal;
   means for applying a pulsed signal to said reset signal terminal;
   a horizontal shift register;
   an amplifier for amplyfing a signal applied to its input onto an output terminal and for setting said input to a reference potential; and
   output switch means for sequentially coupling said second conductors to the input terminal of said amplifier in response to outputs of said horizontal shift register.

8. The image sensing device of claim 7, wherein said field-effect transistors have gates coupled in common to a clock signal terminal.

9. The image sensing device of claim 4, wherein said resetting means applies a pulsed signal to said chip reset signal terminal.

* * * * *